(12) United States Patent
Cooley

(10) Patent No.: US 8,730,334 B2
(45) Date of Patent: May 20, 2014

(54) TECHNIQUES FOR PROVIDING IMPROVED PERPETRATOR IMAGING

(75) Inventor: Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 760 days.

(21) Appl. No.: 12/964,972

(22) Filed: Dec. 10, 2010

(65) Prior Publication Data

US 2012/0147203 A1   Jun. 14, 2012

(51) Int. Cl.
*H04N 5/232* (2006.01)
*H04M 1/66* (2006.01)
*G06K 9/00* (2006.01)

(52) U.S. Cl.
USPC ............ 348/211.3; 455/411; 382/118

(58) Field of Classification Search
USPC ............ 348/211.3; 455/411; 382/118
See application file for complete search history.

(56) References Cited

U.S. PATENT DOCUMENTS

| | | |
|---|---|---|
| 2002/0097145 A1 | 7/2002 | Tumey et al. |
| 2003/0179911 A1* | 9/2003 | Ho et al. ............ 382/118 |
| 2008/0076459 A1 | 3/2008 | Shaju |
| 2009/0253408 A1 | 10/2009 | Fitzgerald et al. |
| 2009/0253410 A1* | 10/2009 | Fitzgerald et al. ............ 455/411 |
| 2010/0115092 A1 | 5/2010 | Westin |
| 2010/0216429 A1* | 8/2010 | Mahajan ............ 455/411 |

OTHER PUBLICATIONS

International Search Report and Written Opinion mailed on Apr. 18, 2012, for International Application No. PCT/US11/64007, filed Dec. 8, 2011 (12 pages).

* cited by examiner

*Primary Examiner* — Joel Fosselman
(74) *Attorney, Agent, or Firm* — Wilmer Cutler Pickering Hale and Dorr LLP

(57) ABSTRACT

Techniques for providing improved perpetrator imaging are disclosed. In one particular exemplary embodiment, the techniques may be realized as a method for providing improved perpetrator imaging comprising identifying a client device as at least one of lost and stolen, detecting, on the client device, a difference in first pixel data associated with a first frame of a visual image and second pixel data associated with a second frame of the visual image, and capturing, on the client device, a plurality of photographs in response to detecting the difference.

20 Claims, 7 Drawing Sheets

TECHNIQUES FOR PROVIDING IMPROVED PERPETRATOR IMAGING

FIELD OF THE DISCLOSURE

The present disclosure relates generally to anti-theft solutions and, more particularly, to techniques for providing improved perpetrator imaging.

BACKGROUND OF THE DISCLOSURE

The consumer and commercial use of mobile devices (e.g., laptops, mobile phones, tablet personal computers (PCs), netbooks, personal digital assistants (PDAs)) is rapidly increasing. Likewise, mobile device theft has also increased with the increase in mobile device use. Accordingly, many mobile devices are manufactured with certain anti-theft mechanisms. Many anti-theft mechanisms currently used, however, operate inefficiently and are ineffective.

In view of the foregoing, it may be understood that there may be significant problems and shortcomings associated with current anti-theft technologies.

SUMMARY OF THE DISCLOSURE

Techniques for providing improved perpetrator imaging are disclosed. In one particular exemplary embodiment, the techniques may be realized as a method for providing improved perpetrator imaging comprising identifying a client device as at least one of lost and stolen, detecting, on the client device, a difference in first pixel data associated with a first frame of a visual image and second pixel data associated with a second frame of the visual image, and capturing, on the client device, a plurality of photographs in response to detecting the difference.

In accordance with other aspects of this particular exemplary embodiment, the identifying the client device as at least one of lost and stolen further may comprise accessing client device status data stored on a server.

In accordance with further aspects of this particular exemplary embodiment, the detecting the difference may further comprise detecting a difference in first pixel data associated with a plurality of groups of pixels and second pixel data associated with the plurality of groups of pixels.

In accordance with additional aspects of this particular exemplary embodiment, the detecting the difference may further comprise detecting an average difference in first pixel data associated with the plurality of groups of pixels and second pixel data associated with the plurality of groups of pixels.

In accordance with other aspects of this particular exemplary embodiment, the detecting the difference may further comprise detecting a difference that exceeds a predetermined threshold.

In accordance with further aspects of this particular exemplary embodiment, the detecting the difference may further comprise detecting a difference for a predetermined period of time.

In accordance with additional aspects of this particular exemplary embodiment, the method may further comprise determining, on the client device, a confidence level for each of the plurality of photographs, ranking, on the client device, the plurality of photographs based on the confidence level of each of the plurality of photographs, and transmitting, to a server, one or more of the plurality of photographs with the highest rankings via a network.

In accordance with other aspects of this particular exemplary embodiment, the determining the confidence level may further comprise executing a face detection algorithm.

In accordance with further aspects of this particular exemplary embodiment, the method may further comprise determining, on the client device, a location value that indicates a location of a potential face in a photograph for each of the plurality of photographs.

In accordance with additional aspects of this particular exemplary embodiment, the method may further comprise determining, on the client device, a size value that indicates a size of a potential face in a photograph for each of the plurality of photographs.

In accordance with other aspects of this particular exemplary embodiment, the ranking the plurality of photographs may further comprise ranking based on the confidence level, the location value, and the size value of each of the plurality of photographs.

In accordance with additional aspects of this particular exemplary embodiment, the techniques may be realized as at least one non-transitory processor readable storage medium for storing a computer program of instructions configured to be readable by at least one processor for instructing the at least one processor to execute a computer process.

In another particular exemplary embodiment, the techniques may be realized as an article of manufacture for providing improved perpetrator imaging, the article of manufacture comprising at least one non-transitory processor readable medium, and instructions stored on the at least one medium, wherein the instructions are configured to be readable from the at least one medium by at least one processor and thereby cause the at least one processor to operate so as to identify a client device as at least one of lost and stolen, detect, on the client device, a difference in first pixel data associated with a first frame of a visual image and second pixel data associated with a second frame of the visual image, and capture, on the client device, a plurality of photographs in response to detecting the difference.

In another particular exemplary embodiment, the techniques may be realized as a system for providing improved perpetrator imaging comprising one or more processors communicatively coupled to a network, wherein the one or more processors are configured to identify a client device as at least one of lost and stolen, detect, on the client device, a difference in first pixel data associated with a first frame of a visual image and second pixel data associated with a second frame of the visual image, and capture, on the client device, a plurality of photographs in response to detecting the difference.

In accordance with further aspects of this particular exemplary embodiment, the one or more processors may be configured to identify the client device as at least one of lost and stolen by accessing client device status data stored on a server.

In accordance with additional aspects of this particular exemplary embodiment, the one or more processors may be configured to detect the difference by detecting a difference in first pixel data associated with a plurality of groups of pixels and second pixel data associated with the plurality of groups of pixels.

In accordance with other aspects of this particular exemplary embodiment, the one or more processors may be configured to detect the difference by detecting an average difference in first pixel data associated with the plurality of groups of pixels and second pixel data associated with the plurality of groups of pixels.

In accordance with further aspects of this particular exemplary embodiment, the one or more processors may be configured to detect the difference by detecting a difference that exceeds a predetermined threshold.

In accordance with additional aspects of this particular exemplary embodiment, the one or more processors may be configured to detect the difference by detecting a difference for a predetermined period of time.

In accordance with additional aspects of this particular exemplary embodiment, the one or more processors may be further configured to determine, on the client device, a confidence level for each of the plurality of photographs, rank, on the client device, the plurality of photographs based on the confidence level of each of the plurality of photographs, and transmit, to a server, one or more of the plurality of photographs with the highest rankings via a network.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
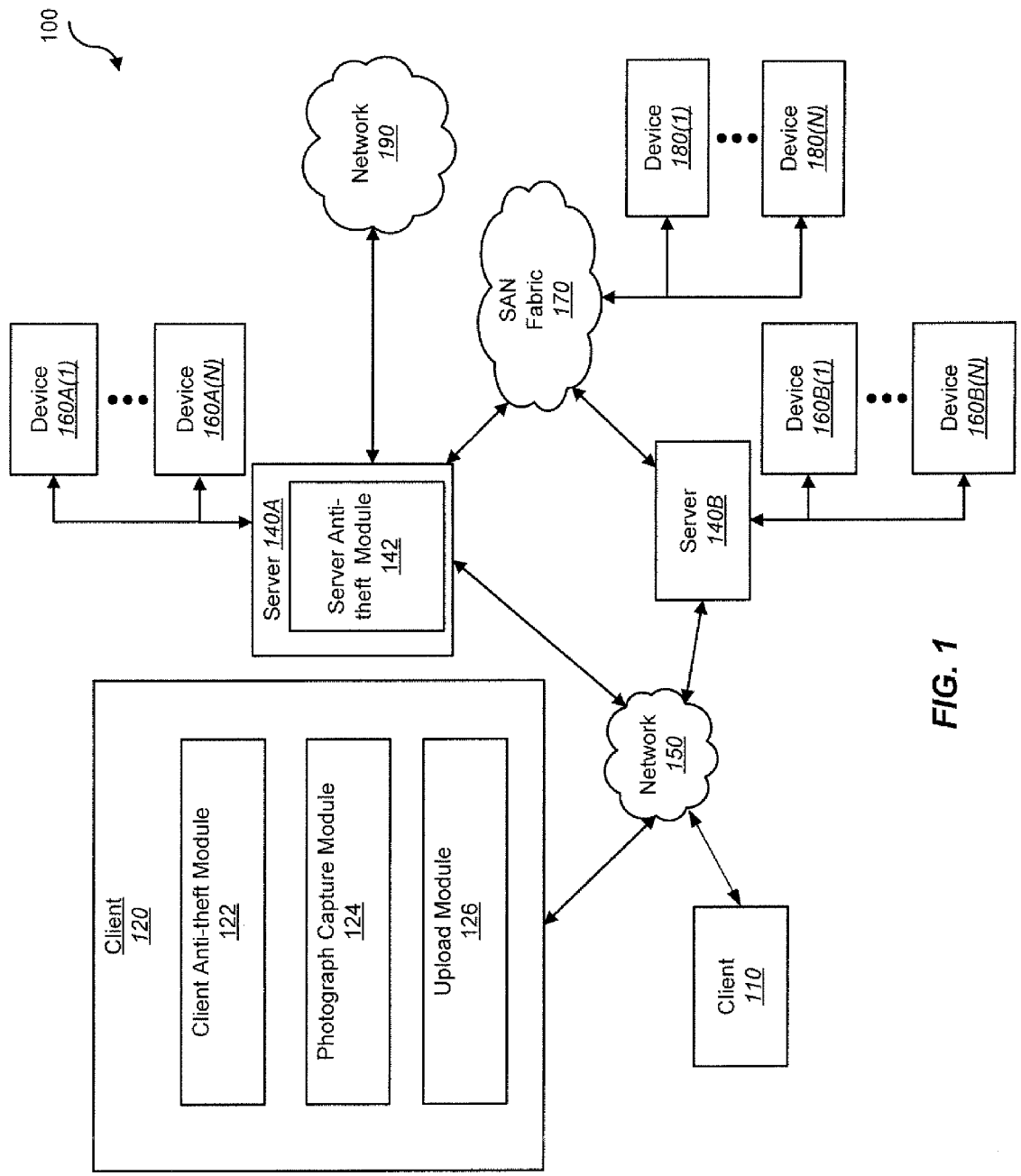
FIG. 1 shows a block diagram depicting a network architecture containing a platform for providing improved perpetrator imaging in accordance with an embodiment of the present disclosure.

Current anti-theft mechanisms that operate on mobile devices (e.g., laptops, mobile phones, tablet PCs, net-books, PDAs) may be configured to capture photographs from a camera coupled to the mobile devices in response to the mobile devices being marked as lost or stolen. Such anti-theft mechanisms capture the photographs in an attempt to capture an image of a perpetrator that may be used to recover a lost or stolen mobile device. Several problems exist, however, with these current anti-theft mechanisms. First, the mobile devices may be configured to capture the photographs based on a timer (e.g., capture one photograph every ten minutes). Accordingly, the likelihood of capturing an image of a perpetrator may be low. Second, the mobile devices may not employ any techniques to select the photographs that are most likely to contain a useful image of a perpetrator (e.g., an image that contains a distinguishable face) for transmission to a server (e.g., an anti-theft backend server). Accordingly, the network resources for transmitting photographs may be inefficiently used.

In one embodiment, certain techniques for providing improved perpetrator imaging are provided. In such an embodiment, a mobile device may be identified as lost or stolen. Based on such an identification, the mobile device may be configured to capture photographs in response to detecting a motion in the mobile device. In certain embodiments, detecting such a motion may include detecting a difference in at least two frames of a visual image (e.g., the capture region) of a camera coupled to the mobile device. That is, the mobile device may be configured to compare a first frame (e.g., the state of all pixels of the visual image at a particular point-in-time) of a visual image at a first time to a second frame (e.g., the state of all pixels of the visual image at another point-in-time) of the visual image at a second time to determine whether the two frames (e.g., the pixel data associated with the two frames) are sufficiently different. In other embodiments, detecting such a motion may include analyzing data generated by any, or a combination, of an accelerometer, a motion sensor, and a tilt sensor.

If, for example, motion is detected in the mobile device, a camera coupled to the mobile device may capture one or more photographs. If, however, motion is not detected in the mobile device, the mobile device may continue to poll for data that indicates that two frames are sufficiently different.

In another embodiment, other techniques for providing improved perpetrator imaging are provided. In such an embodiment, a mobile device may calculate a confidence level that a face is contained in a photograph using one or more face detection algorithms. The mobile device may also rank one or more photographs based on the corresponding confidence levels. One or more photographs with the highest ranking may be transmitted to a server (e.g., an anti-theft backend server) to reduce the amount of network resources necessary to implement the presently discussed anti-theft techniques. In certain embodiments, a location value that indicates a location of a potential face in a photograph and a size value that indicates a size of a potential face in a photograph may be calculated for each photograph. Accordingly, the photographs may be ranked based on any, or a combination, of a confidence level, location value, and a size value.

FIG. 1 shows a block diagram depicting a network architecture 100 containing a platform for providing improved perpetrator imaging in accordance with an embodiment of the present disclosure. FIG. 1 is a simplified view of network architecture 100, which may include additional elements that are not depicted. Network architecture 100 may contain client 110, client 120, server 140A, as well as server 140E (one or more of which may be implemented using computer system 200 shown in FIG. 2). Client 110, client 120, server 140A, and server 140E may be communicatively coupled to a network 150. Server 140A may be communicatively coupled to storage devices 160A(1)-(N), and server 140B may be communicatively coupled to storage devices 160B(1)-(N). Server 140A may contain a server anti-theft module 142. Server 140A and server 140B may be communicatively coupled to a SAN (Storage Area Network) fabric 170. SAN fabric 170 may support access to storage devices 180(1)-(N) by server 140A and server 140B, and by client 110 and client 120 via network 150. Server 140A may be communicatively coupled to network 190. Client 120 may contain one or more modules for providing improved perpetrator imaging including client anti-theft module 122, photograph capture module 124, and upload module 126.

Figure 2:
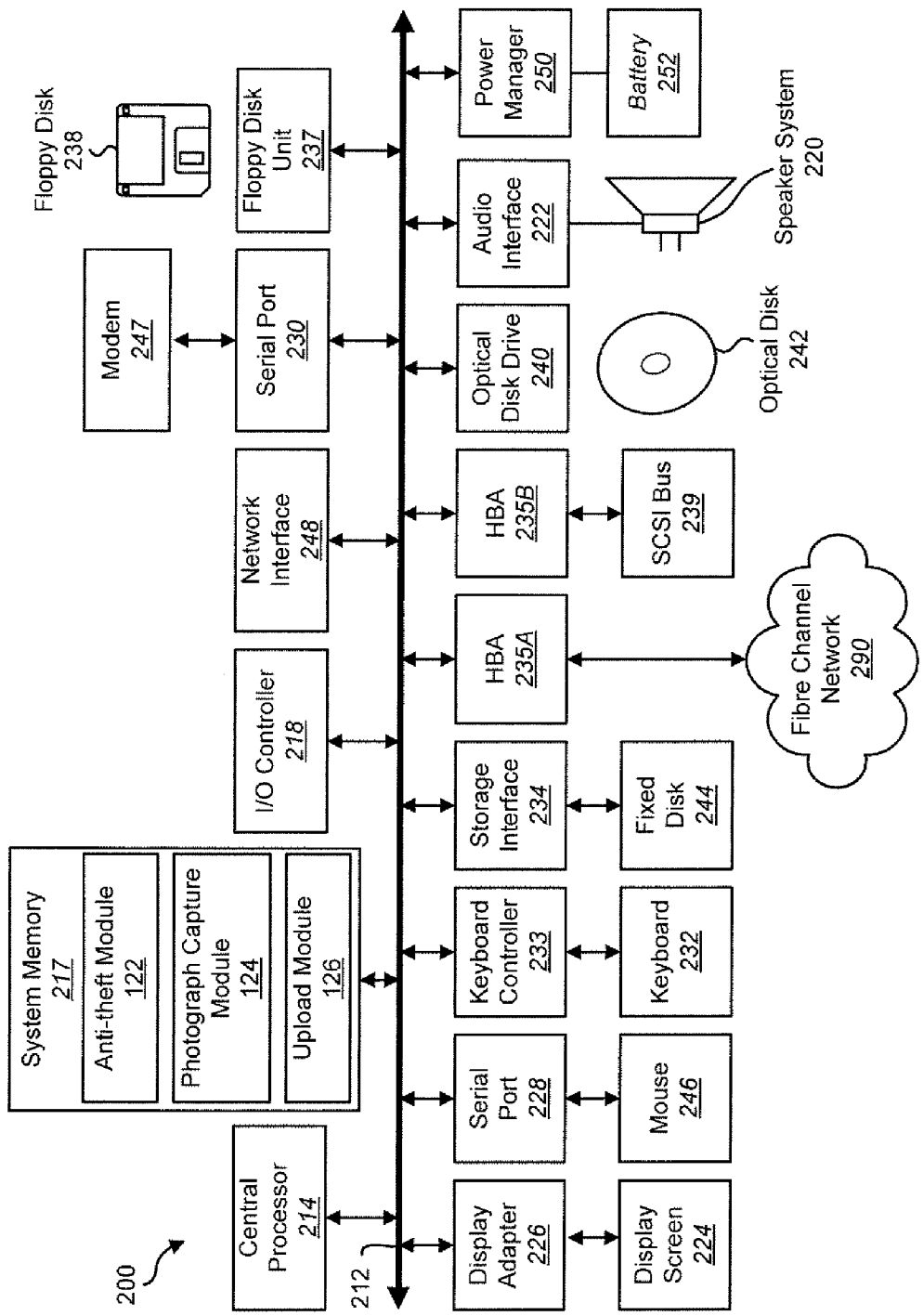
FIG. 2 depicts a block diagram of a computer system in accordance with an embodiment of the present disclosure.

With reference to computer system 200 of FIG. 2, modem 247, network interface 248, or some other method may be used to provide connectivity from one or more of client 110 and client 120 to network 150. Client 120 may be able to access information on server 140A or server 140B using, for example, a web browser or other client software. Such a client may allow client 120 to access data hosted by server 140A or server 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between client 110, client 120, server 140A, server 140B, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to client 110, client 120, server 140A, or server 140B. Storage devices 160A(1)-(N), 160B(1)-(N), and/or 180(1)-(N) may utilize a redundant array of inexpensive disks ("RAID"), magnetic tape, disk, a storage area network ("SAN"), an Internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup, replication, or archival purposes.

According to some embodiments, client 110 and client 120 may be a smartphone, PDA, desktop computer, a laptop computer, a server, another computer, or another device coupled via a wireless or wired connection to network 150. Client 110 and client 120 may receive data from user input, a database, a file, a web service, and/or an application programming interface.

Server 140A and server 140B may be application servers, archival platforms, backup servers, backend servers, network storage devices, media servers, email servers, document management platforms, enterprise search servers, or other devices communicatively coupled to network 150. Server 140A and server 140B may utilize one of storage devices 160A(1)-(N), 160B(1)-(N), and/or 180(1)-(N) for the storage of application data, replication data, backup data, or other data. Server 140A and server 140B may be hosts, such as an application server, which may process data traveling between client 110 and client 120 and a backup platform, a backup process, and/or storage. According to some embodiments, server 140A and server 140B may be platforms used for backing up and/or archiving data.

Client anti-theft module 122, photograph capture module 124, upload module 126, and server anti-theft module 142 are discussed in further detail below.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, or other storage medium. For example, anti-theft module 122, photograph capture module 124, and upload module 126 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an Internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
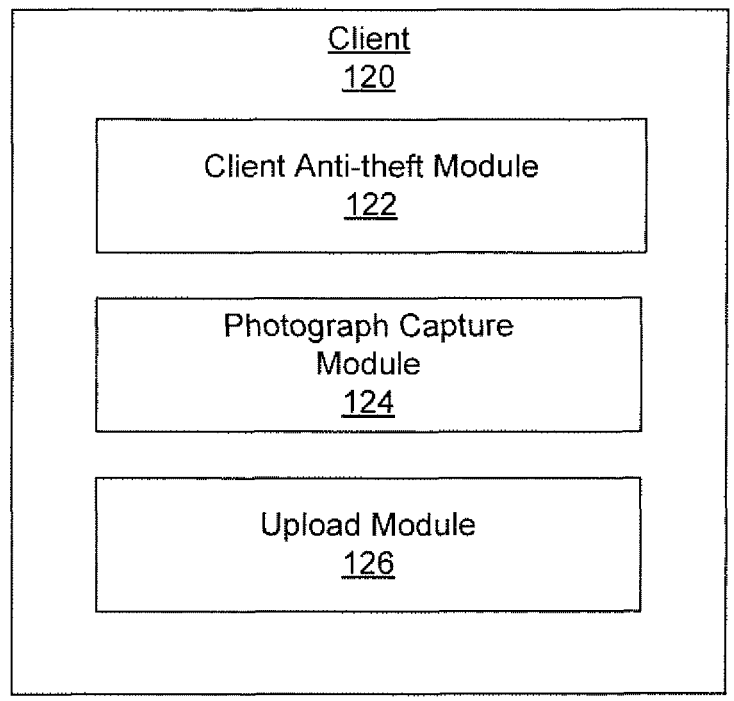
FIG. 3 shows modules of a client in accordance with an embodiment of the present disclosure.

FIG. 3 shows modules of a client 120 in accordance with an embodiment of the present disclosure. As illustrated, the client 120 may contain one or more components including a client anti-theft module 122, a photograph capture module 124, and an upload module 126.

The description below describes network elements, computers, and/or components of a system and method for providing improved perpetrator imaging that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Client anti-theft module 122 may be configured to identify a client device (e.g., client 120) as lost or stolen. In one embodiment, the client anti-theft module 122 may identify a client device (e.g., client 120) as lost or stolen by accessing client device status data. Client device status data may indicate a possession status (e.g., lost, stolen) of one or more client devices. In certain embodiments, the client anti-theft module 122 may access client device status data on a communicatively coupled server (e.g., an anti-theft backend server).

Client anti-theft module 122 may be configured to determine whether a client device (e.g., client 120) has been lost or stolen. In one embodiment, the client anti-theft module 122 may determine whether a client device (e.g., client 120) has been lost or stolen based on geographic data (e.g., geo-sensing data, global positioning system (GPS) data) generated by or on behalf of the client device. For example, the client anti-theft module 122 may determine that a client device (e.g., client 120) has been lost or stolen based on geographic data that indicates that the client device has been moved from a particular location (e.g., ten feet outside of a particular office building, five feet outside of a dormitory room). In another embodiment, the client anti-theft module 122 may determine whether a client device (e.g., client 120) has been lost or stolen based on motion data generated by or on behalf of the client device. For example, the client anti-theft module 122 may determine that a client device (e.g., client 120) has been lost or stolen based on motion data that indicates that the client device has been moved a particular distance (e.g., two inches from an initial position, one foot from an initial position). In another embodiment, the client anti-theft module 122 may determine whether a client device (e.g., client 120) has been lost or stolen based on force data generated by or on behalf of the client device. For example, the client anti-theft module 122 may determine that a client device (e.g., client 120) has been lost or stolen based on force data that indicates that a security cable attached to the client device has been removed (e.g., forcefully removed).

Photograph capture module 124 may be configured to detect motion in a client device (e.g., client 120) in response to the client device being identified as lost or stolen. In one embodiment, the photograph capture module 124 may detect motion in a client device (e.g., client 120) by detecting a difference between at least two frames of a visual image (e.g., capture region) of a camera coupled to the client device. In such an embodiment, the photograph capture module 124 may compare pixel data associated with a first frame of a visual image at a first time to pixel data associated with a second frame of the visual image at a second time to determine whether the two frames are sufficiently different. That is, the photograph capture module 124 may compare pixel data from two different points-in-time to determine whether the pixel data has changed overtime (e.g., motion in the client device is detected).

In certain embodiments, the photograph capture module 124 may determine that a sufficient difference exists between two frames if the average difference in pixel data of groups of pixels exceeds a predetermined threshold (e.g., a predetermined amount of difference). For example, a threshold may be determined to be 25% based on design preferences. Accordingly, if the pixel data changes in at least an average of 25% of pixels between two frames, the photograph capture module 124 may determine that a sufficient difference exists between the two frames and motion is detected.

In certain embodiments, the photograph capture module 124 may determine that a sufficient difference exists if the predetermined amount of difference in pixel data exist between multiple frames for a predetermined period of time. For example, an amount of difference threshold may be determined to be 25% and a period of time may be determined to be one second based on design preferences. Accordingly, if the pixel data changes in at least an average of 25% of pixels between multiple frames for at least one second, the photograph capture module 124 may determine that a sufficient difference exists between the multiple frames and motion is detected.

In another embodiment, the photograph capture module 124 may detect motion in a client device (e.g., client 120) by accessing and analyzing data generated by any, or a combination, of an accelerometer, a motion sensor, and a tilt sensor. That is, the photograph capture module 124 may determine that motion is detected in client device (e.g., client 120) if data generated by an accelerometer, a motion sensor, or a tilt sensor coupled to the client device exceeds one or more predetermined thresholds.

In response to motion being detected in a client device (e.g., client 120), the photograph capture module 124 may be configured to capture one or more photographs using a camera coupled to the client device. In one embodiment, the photograph capture module 124 may capture a sequence of photographs in response to motion being detected in the client device. In another embodiment, the photograph capture module 124 may capture one or more photographs based on a predetermined interval (e.g., capture five photographs every five seconds, capture one photograph every other second) in response to motion being detected in the client device.

Photograph capture module 124 may be configured to calculate a confidence level, a location value, and a size value for each photograph captured. In one embodiment, the photograph capture module 124 may calculate a confidence level that a face is contained in a photograph for each photograph captured by executing one or more face detection algorithms. The face detection algorithms executed by the photograph capture module 124 may include any, or a combination, of a face detection as a pattern-classification task algorithm (e.g., implementing binary pattern-classification task), a controlled background face detection algorithm (e.g., removing plain or static backgrounds to reveal and detect a face), a color face detection algorithm (e.g., using skin color to find face segments), a motion face detection algorithm (e.g., detecting specific types of motions that are unique to faces, such as: blinking, raised eyebrows, flared nostrils, wrinkled forehead, opened mouth), and a model-based face detection algorithm (e.g., passing models of faces over images to detect faces).

In another embodiment, the photograph capture module 124 may calculate a location value that indicates a location of a potential face (e.g., by distance) that is contained in a photograph for each photograph captured by executing the one or more face detection algorithms described above. For example, a first location value associated with a first captured photograph may indicate that a potential face was located approximately 100 feet from the camera during capture. In another example, a second location value associated with a second captured photograph may indicate that a potential face was located approximately two feet from the camera during capture.

In another embodiment, the photograph capture module 124 may calculate a size value that indicates a size of a potential face (e.g., by height and width, by circumference) that is contained in a photograph for each photograph captured by executing the one or more face detection algorithms described above. For example, a first size value associated with a first captured photograph may indicate that a potential face had a height of two centimeters and a width of one centimeter during capture. In another example, a second size value associated with a second captured photograph may indicate that a potential face had a height of eight inches and a width of five inches during capture.

Photograph capture module 124 may be configured to rank each photograph captured based on any, or a combination, of a corresponding confidence level, a corresponding location value, and a corresponding size value. Accordingly, the photographs with the highest confidence levels, the shortest location values, and the largest size values may be ranked the highest. Furthermore, the photographs with the lowest confidence levels, the longest location values, the smallest size values may be ranked the lowest. The photograph capture module 124 may select and transmit one or more of the photographs with the highest rankings to a server (e.g., an anti-theft backend server) to aid in the recovery of the lost or stolen client device.

Upload module 126 may be configured to transmit the selected photographs to a server (e.g., an anti-theft backend server). In one embodiment, the upload module 126 may be configured to detect when a client device (e.g., client 120) is connected to a network (e.g., the Internet). In response to detecting network connectivity, the upload module 126 may transmit the selected photographs to the server (e.g., an anti-theft backend server).

Figure 4:
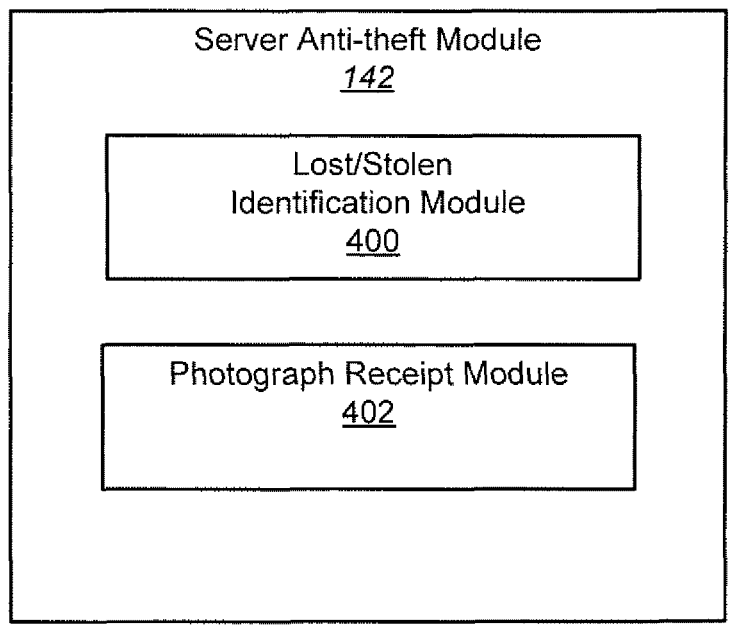
FIG. 4 shows a server anti-theft module in accordance with an embodiment of the present disclosure.

FIG. 4 shows a server anti-theft module 142 in accordance with an embodiment of the present disclosure. As illustrated, the server anti-theft module 142 may contain one or more components including a lost/stolen identification module 400 and a photograph receipt module 402.

The description below describes network elements, computers, and/or components of a system and method for providing improved perpetrator imaging that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Lost/stolen identification module 400 may be configured to store client device status data associated with multiple communicatively coupled client devices (e.g., client 110, 120). Client device status data may indicate a possession status (e.g., lost, stolen) of one or more client devices. Accordingly, as a client device is reported as lost or stolen, the lost/stolen identification module 400 may update the appropriate client device status data.

Photograph receipt module 402 may be configured to receive one or more photographs from one or more communicatively coupled client devices (e.g., client 110, client 120) that have been identified as lost or stolen. In certain embodiments, the photograph receipt module 402 may store the photographs received for use in recovering the lost or stolen client device.

Figure 5:
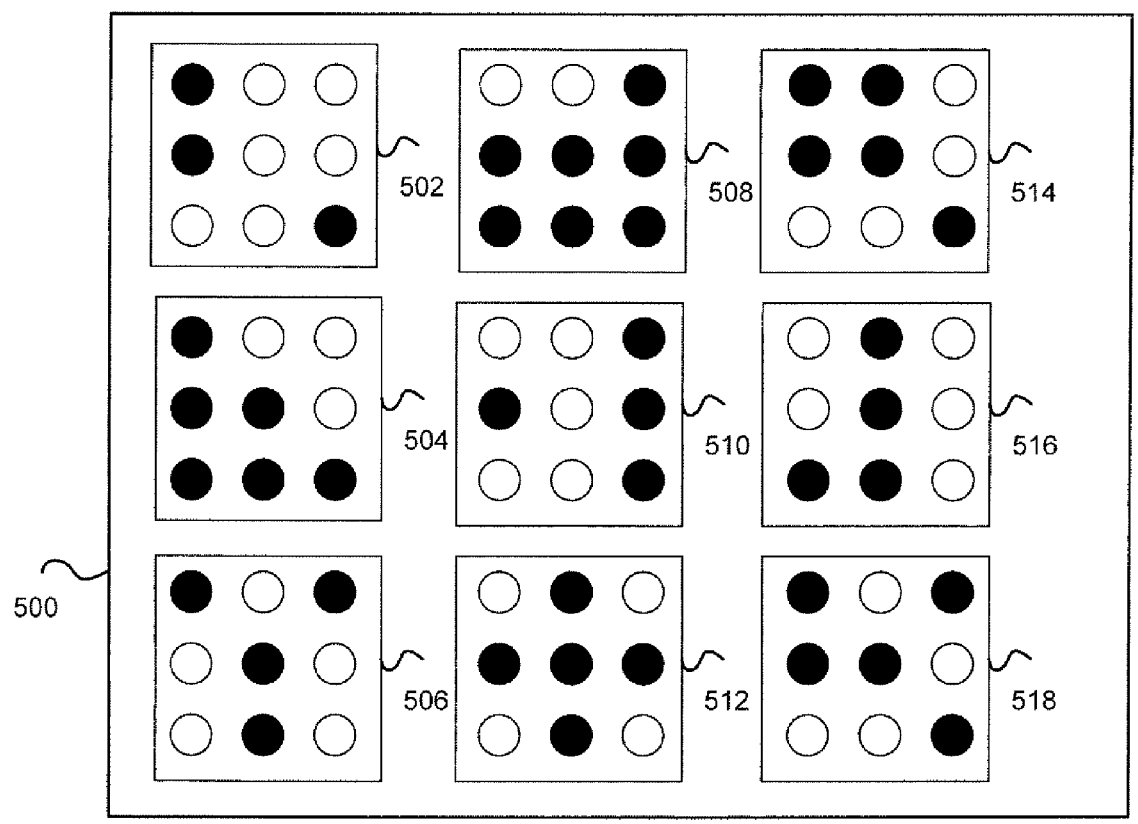
FIG. 5 shows pixel data in accordance with an embodiment of the present disclosure.

FIG. 5 shows pixel data in accordance with an embodiment of the present disclosure. As illustrated, a visual image 500 of a camera coupled to a client device (e.g., client 120) may contain multiple groups of pixels. For example, the visual image 500 may contain pixel groups 502, 504, 506, 508, 510, 512, 514, 516, 518. Each pixel group may contain nine pixels.

Based on pixel data from two consecutive frames, the black pixels may be considered changed while the white pixels may be considered unchanged. As shown, pixel group 502 may have a 33% pixel difference, pixel group 504 may have a 67% pixel difference, pixel group 506 may have a 44% pixel difference, pixel group 508 may have a 78% pixel difference, pixel group 510 may have a 44% pixel difference, pixel group 512 may have a 56% pixel difference, pixel group 514 may have a 56% pixel difference, pixel group 516 may have a 44% pixel difference, and pixel group 518 may have a 56% pixel difference. Based on these pixel differences, the average pixel difference between two consecutive frames for pixel groups 502, 504, 506, 508, 510, 512, 514, 516, 518 may be 53%. If, for example, the predetermined amount of difference is 25%, the difference in pixel data between two consecutive frames represented in FIG. 5 may be sufficiently different for motion in a client device to be detected.

Figure 6:
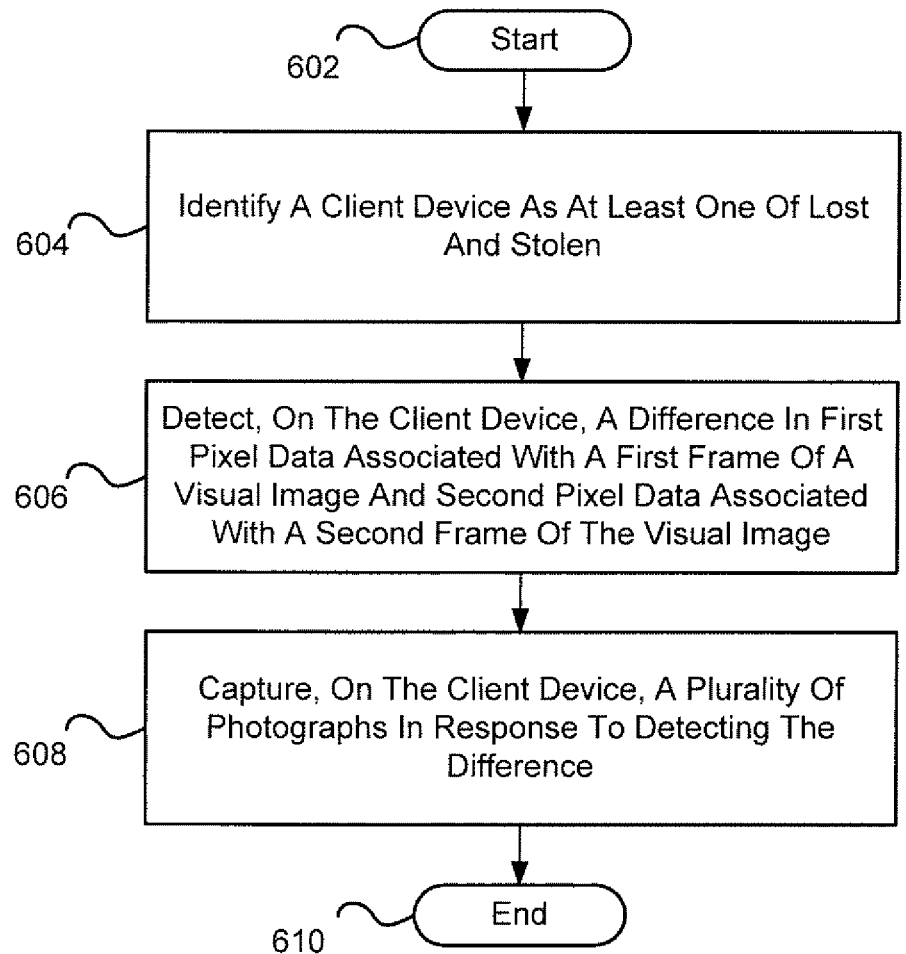
FIG. 6 depicts a method for providing improved perpetrator imaging in accordance with an embodiment of the present disclosure.

FIG. 6 depicts a method 600 for providing improved perpetrator imaging in accordance with an embodiment of the present disclosure. At block 602, the method 600 may begin.

At block 604, a client device may be identified as at least one of lost and stolen. In one embodiment, a client device may be identified as lost or stolen by accessing client device status data stored on a communicatively coupled server (e.g., an anti-theft backend server).

At block 606, a difference in first pixel data associated with a first frame of a visual image and second pixel data associated with a second from of the visual image is detected on the client device. The first frame may be taken at a first time and the second frame may be taken at a second time. Detecting such a difference may indicate motion in a client device.

At block 608, a plurality of photographs may be captured on the client device in response to detecting the difference. In one embodiment, a sequence of multiple photographs may be captured on the client device in response to detecting the difference. In another embodiment, one or more photographs may be captured based on a predetermined interval (e.g., five photographs every five seconds, one photograph every other second) in response to detecting the difference.

At block 610, the method 600 may end.

Figure 7:
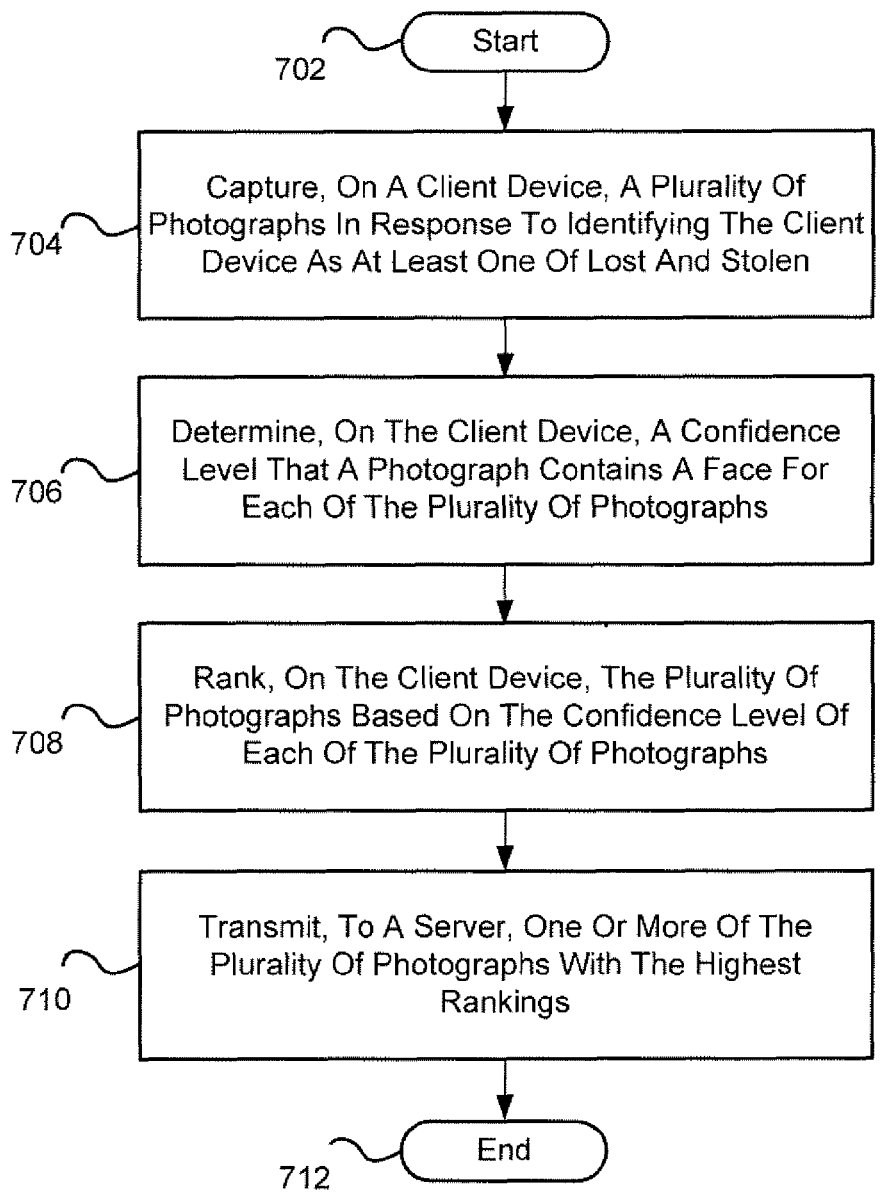
FIG. 7 depicts another method for providing improved perpetrator imaging in accordance with an embodiment of the present disclosure.

FIG. 7 depicts another method 700 for providing improved perpetrator imaging in accordance with an embodiment of the present disclosure. At block 702, the method 700 may begin.

At block 704, a plurality of photographs may be captured on a client device in response to identifying the client device as at least one of lost and stolen. In one embodiment, a sequence of multiple photographs may be captured on the client device in response to detecting the difference. In another embodiment, one or more photographs may be captured based on a predetermined interval (e.g., five photographs every five seconds, one photograph every other second) in response to detecting the difference.

At block 706, a confidence level that a photograph contains a face is determined for each of the plurality of photographs on the client device. In one embodiment, a confidence level is determined for each of the plurality of photographs by executing one or more face detection algorithms.

At block 708, the plurality of photographs are ranked based on the confidence level of each of the plurality of photographs on the client device. In one embodiment, the photographs with the highest confidence levels are ranked the highest, while the photographs with the lowest confidence levels are ranked the lowest.

At block 710, one or more of the plurality of photographs with the highest rankings are transmitted to a server. In one embodiment, the one or more photographs with the highest confidence level rankings are transmitted to a backend server (e.g., an anti-theft backend server).

At block 712, the method 700 may end.

At this point it should be noted that providing improved perpetrator imaging in accordance with the present disclosure as described above typically involves the processing of input data and the generation of output data to some extent. This input data processing and output data generation may be implemented in hardware or software. For example, specific electronic components may be employed in a server anti-theft module or similar or related circuitry for implementing the functions associated with providing improved perpetrator imaging in accordance with the present disclosure as described above. Alternatively, one or more processors operating in accordance with instructions may implement the functions associated with providing improved perpetrator imaging in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for providing improved perpetrator imaging comprising:
    identifying a client device as at least one of lost and stolen;
    detecting, on the client device, a difference in first pixel data associated with a first frame of a visual image and second pixel data associated with a second frame of the visual image;
    capturing, on the client device, a plurality of photographs in response to detecting the difference;
    determining, on the client device, a confidence level for each of the plurality of photographs; and
    ranking, on the client device, the plurality of photographs based on the confidence level of each of the plurality of photographs.

2. The method of claim 1, wherein identifying the client device as at least one of lost and stolen further comprises accessing client device status data stored on a server.

3. The method of claim 1, wherein detecting the difference further comprises detecting a difference in first pixel data associated with a plurality of groups of pixels and second pixel data associated with the plurality of groups of pixels.

4. The method of claim 3, wherein detecting the difference further comprises detecting an average difference in first pixel data associated with the plurality of groups of pixels and second pixel data associated with the plurality of groups of pixels.

5. The method of claim 1, wherein detecting the difference further comprises detecting a difference that exceeds a predetermined threshold.

6. The method of claim 1, wherein detecting the difference further comprises detecting a difference for a predetermined period of time.

7. The method of claim 1, further comprising:
    transmitting, to a server, one or more of the plurality of photographs with the highest rankings via a network.

8. The method of claim 7, wherein determining the confidence level further comprises executing a face detection algorithm.

9. The method of claim 7, further comprising determining, on the client device, a location value that indicates a location of a potential face in a photograph for each of the plurality of photographs.

10. The method of claim 9, further comprising determining, on the client device, a size value that indicates a size of a potential face in a photograph for each of the plurality of photographs.

11. The method of claim 10, wherein ranking the plurality of photographs further comprises ranking based on the confidence level, the location value, and the size value of each of the plurality of photographs.

12. At least one non-transitory processor readable storage medium for storing a computer program of instructions configured to be readable by at least one processor for instructing the at least one processor to execute a computer process for performing the method as recited in claim 1.

13. An article of manufacture for providing improved perpetrator imaging, the article of manufacture comprising:
  at least one non-transitory processor readable medium; and
  instructions stored on the at least one medium; wherein the instructions are configured to be readable from the at least one medium by at least one processor and thereby cause the at least one processor to operate so as to:
    identify a client device as at least one of lost and stolen;
    detect, on the client device, a difference in first pixel data associated with a first frame of a visual image and second pixel data associated with a second frame of the visual image;
    capture, on the client device, a plurality of photographs in response to detecting the difference;
    determine, on the client device, a confidence level for each of the plurality of photographs; and
    rank, on the client device, the plurality of photographs based on the confidence level of each of the plurality of photographs.

14. A system for providing improved perpetrator imaging comprising:
  one or more processors communicatively coupled to a network; wherein the one or more processors are configured to:
    identify a client device as at least one of lost and stolen;
    detect, on the client device, a difference in first pixel data associated with a first frame of a visual image and second pixel data associated with a second frame of the visual image;
    capture, on the client device, a plurality of photographs in response to detecting the difference;
    determine, on the client device, a confidence level for each of the plurality of photographs; and
    rank, on the client device, the plurality of photographs based on the confidence level of each of the plurality of photographs.

15. The system of claim 14, wherein the one or more processors are configured to identify the client device as at least one of lost and stolen by accessing client device status data stored on a server.

16. The system of claim 14, wherein the one or more processors are configured to detect the difference by detecting a difference in first pixel data associated with a plurality of groups of pixels and second pixel data associated with the plurality of groups of pixels.

17. The system of claim 16, wherein the one or more processors are configured to detect the difference by detecting an average difference in first pixel data associated with the plurality of groups of pixels and second pixel data associated with the plurality of groups of pixels.

18. The system of claim 14, wherein the one or more processors are configured to detect the difference by detecting a difference that exceeds a predetermined threshold.

19. The system of claim 14, wherein the one or more processors are configured to detect the difference by detecting a difference for a predetermined period of time.

20. The system of claim 14, wherein the one or more processors are further configured to:
  transmit, to a server, one or more of the plurality of photographs with the highest rankings via a network.

* * * * *